United States Patent [19]

O'Callaghan

[11] 4,100,855
[45] Jul. 18, 1978

[54] UNDERWATER POWER HEAD

[76] Inventor: Larry John O'Callaghan, Flat 10, 132 Sixth Ave., Inglewood, Australia

[21] Appl. No.: 781,215

[22] Filed: Mar. 25, 1977

[30] Foreign Application Priority Data

May 11, 1976 [AU] Australia ............................. 13846/76

[51] Int. Cl.$^2$ ............................................. F42B 13/54
[52] U.S. Cl. ........................................ 102/48; 42/1 L
[58] Field of Search ............................. 42/1 L; 102/48

[56] References Cited

U.S. PATENT DOCUMENTS

| | | | |
|---|---|---|---|
| 2,888,768 | 6/1959 | Taylor | 42/1 L |
| 3,210,877 | 10/1965 | Liberatore | 42/1 L |
| 3,274,936 | 9/1966 | Messina et al. | 42/1 L |
| 3,300,888 | 1/1967 | Belcher et al. | 42/1 L |

*Primary Examiner*—Charles T. Jordan
*Attorney, Agent, or Firm*—Harness, Dickey & Pierce

[57] ABSTRACT

A Power head for a fishing spear comprising a chamber to house an explosive cartridge open at one end, and a firing mechanism detachably secured to the other end of the chamber, said mechanism comprising a cylinder having two pistons slidably mounted therein and spaced apart, said first piston being connected to a piston rod projecting from the end of the cylinder remote from the chamber and said second piston being fitted with a firing pin adapted to act on a cartridge in the chamber, said cylinder being provided with a plurality of spaced ports through which water can enter and fill the space in the cylinder between the pistons, the first ports being adapted to be closed as the first piston moves along the cylinder towards the chamber and the second ports being adapted to be closed as the second piston moves in the same direction, the movement of the second piston being effected through water trapped in the cylinder between the two pistons after the first ports have been closed.

5 Claims, 2 Drawing Figures

UNDERWATER POWER HEAD

This invention relates to a power head for use underwater by both the amateur and professional skin diver.

A power head is the term commonly used by skindivers to describe a device that can be attached to the end of a spear shaft. The device normally contains a chamber into which is placed an explosive device such as a shotgun cartridge. A firing mechanism is generally situated behind the cartridge chamber so that when the spear is fired towards a shark or similar large fish, the firing pin moves forward and activates the cartridge immediately when contact with the fish takes place. This form of underwater firearm has been used as a means of defence against menacing sharks for some time.

However, in most countries it is still an illegal weapon due to the fact that all variations developed to date have been able to be operated equally as well out of the water resulting in great danger and possible injury to human life.

One of the objects of this invention is to develop a power head which is unable to be fired or operated out of the water thereby rendering it safe for all to handle and yet still be an efficient effective firearm under water.

In one form the invention resides in a power head for a fishing spear comprising a chamber to house an explosive cartridge open at one end, and a firing mechanism detachably secured to the other end of the chamber, said mechanism comprising a cylinder having two pistons slidably mounted therein and spaced apart, said first piston being connected to a piston rod projecting from the end of the cylinder remote from the chamber and said second piston being fitted with a firing pin adapted to act on a cartridge in the chamber, said cylinder being provided with a plurality of spaced ports through which water can enter and fill the space in the cylinder between the pistons, the first ports being adapted to be closed as the first piston moves along the cylinder towards the chamber and the second ports being adapted to be closed as the second piston moves in the same direction, the movement of the second piston being effected through water trapped in the cylinder between the two pistons after the first ports have been closed.

The invention will be better understood by reference to the following description of one specific embodiment as shown in the accompanying drawings wherein.

Figure 1:
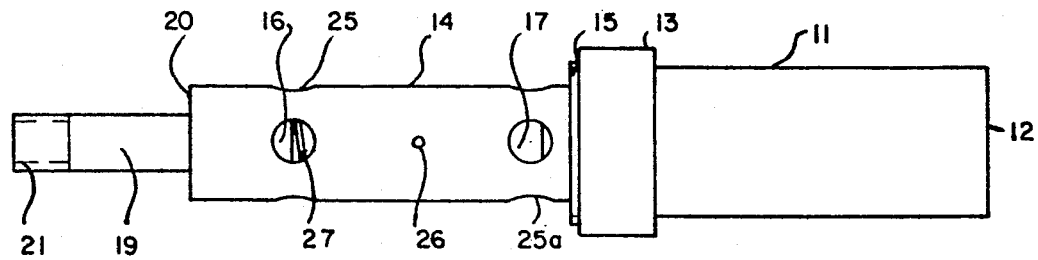
FIG. 1 is a plan view of the power head.
Figure 2:
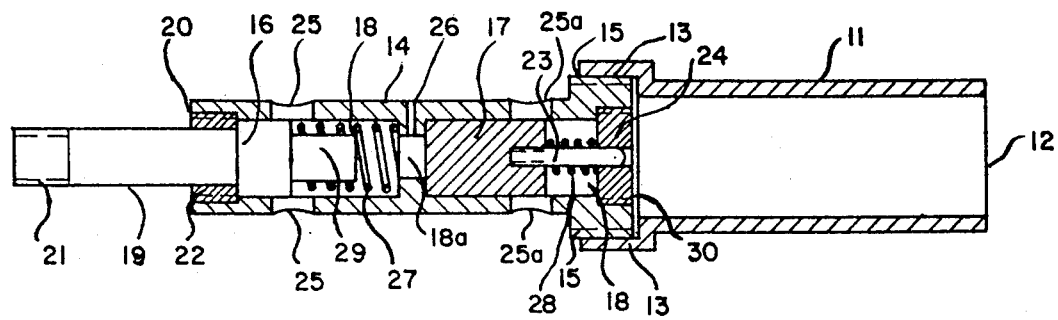
FIG. 2 is a sectional side elevational view of the power head.

In this embodiment the power head is constructed comprising a chamber 11 to house an explosive cartridge. The chamber 11 being open at end 12 and containing an inner thread on end 13. A firing mechanism 14 is detachably secured to end 13 of chamber 11 by means of a mating external thread being provided on end 15. The firing mechanism 14 comprises a cylinder 18 having two pistons 16 and 17 respectively, slidably mounted within the cylinder 18 and spaced apart as shown in FIG. 2 of the drawings. The first piston 16 is connected to a piston rod 19 which projects from end 20 of the mechanism 14. and is preferably threaded at its extremity 21 to enable the power head to be attached to a fishing spear. A collar 22 is threaded into end 20 of the mechanism to prevent the first piston 16 from falling out of the cylinder 18 and also to act as a guide for any movement of the piston rod 19. The second piston 17 is fitted with a firing pin 23 which is adapted to act on a cartridge in chamber 11. A collar 24 is threaded into end 15 of the mechanism to prevent the second piston 17 from falling out of the cylinder 18 and also to act as a guide for the firing pin 23. The mechanism 14 is provided with a plurality of ports 25 and 25a circumferentially located to allow water to enter and fill the space in the cylinder 18 between the pistons 16 and 17. A narrow air bleed hole 26 is provided to link the central portion 18a of the cylinder to the atmosphere. Springs 27 and 28 are provided to ensure that the respective pistons 16 and 17 return to their normal position after the power head has been fired.

Preferably the first piston 16 has the piston face 29 turned down to a smaller dimension than the actual piston 16. This was found to be necessary to ensure that spring 27 did not become fully compressed and eventually lead to failure.

In operation the power head is attached to the end of a fishing spear by way of threaded stem 21, an explosive cartridge is placed within chamber 11 and firmly held in position when chamber 11 is secured to the firing mechanism 14. The conventional lip provided on a cartridge shell being accommodated in the area 30 provided between chamber 11 and mechanism 14.

In order to be able to appreciate the complete safety of this power head, the description of operation shall now be of two parts. Firstly with the device under water and secondly with the device out of the water.

When immersed the fluid immediately flows through the number of ports 25, 25a and fills the cylinder 18. When the fishing spear is fired towards a shark or other large fish and end 12 of the chamber 11 makes contact with the target, the inertia of the spear causes piston 16 to move forward thereby closing off the ports 25. Spring 27 is compressed and the water trapped between the pistons 16 and 17 acts as a hydraulic ram and pushes the second piston 17 forward. Spring 28 is compressed and the firing pin 23 projects through collar 24 just far enough as is necessary to activate the cartridge in chamber 11. On the action of firing being completed the springs 27 and 28 return pistons 16 and 17 to their normal position. Chamber 11 can then be removed from the power head, the empty cartridge shell taken therefrom and a fresh cartridge inserted. The chamber 11 is secured to the firing mechanism 14 and is again ready for use.

When removed from the water all fluid within the cylinder 18 drains away through the ports 25 and 25a. On firing the device out of the water the end 12 of the chamber 11 makes contact with the target and piston 16 moves forward as described above. However, in this particular case any air trapped between the two pistons in the central portion 18a of the cylinder is expelled to atmosphere through the narrow bleed hole 26. In addition, as air is compressable and fluids are not, there is no great pressure exerted on piston 17 and the firing pin 23 does not move forward to activate the cartridge. Spring 27 returns piston 16 to its original position.

Whilst the invention has been described with reference to one specific embodiment, it is not limited thereto. It will be appreciated that various modifications in the construction illustrated in the drawings may be effected without departing from the scope of the invention as defined in the appended claims.

I claim:

1. A power head for a fishing spear comprising a chamber to house an explosive cartridge open at one end, and a firing mechanism detachably secured to the other end of the chamber, said mechanism comprising a cylinder having two pistons slidably mounted therein and spaced apart, said first piston being connected to a piston rod projecting from the end of the cylinder remote from the chamber and said second piston being fitted with a firing pin adapted to act on a cartridge in the chamber, said cylinder being provided with a plurality of spaced ports through which water can enter and fill the space in the cylinder between the pistons, the first ports being adapted to be closed as the first piston moves along the cylinder towards the chamber and the second ports being adapted to be closed as the second piston moves in the same direction, the movement of the second piston being effected through water trapped in the cylinder between the two pistons after the first ports have been closed.

2. A power head for a fishing spear as claimed in claim 1 wherein the first said piston has its piston face of a smaller dimension than the body of the said first piston.

3. A power head for a fishing spear as claimed in claim 1 wherein springs are provided in front of the first and second pistons to return said pistons to their neutral position after having been activated.

4. A power head for a fishing spear as claimed in claim 3 wherein collars are provided in either end of the firing mechanism to retain said first and second pistons within the cylinder and to act as a guide for the piston rod at one end and a firing pin at the other end of the firing mechanism.

5. A power head for a fishing spear as claimed in claim 1 wherein a narrow air passage is provided between the central portion of the cylinder between the two pistons and the atmosphere.

* * * * *